(12) United States Patent
Visoz et al.

(10) Patent No.: US 11,924,123 B2
(45) Date of Patent: Mar. 5, 2024

(54) METHOD FOR MANAGING A TRANSMISSION OF SEQUENCES OF DATA SYMBOLS

(71) Applicant: Orange, Paris (FR)

(72) Inventors: Raphaël Visoz, Châtillon (FR); Hao Lin, Châtillon (FR); Benoît Graves, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 352 days.

(21) Appl. No.: 17/312,877

(22) PCT Filed: Nov. 29, 2019

(86) PCT No.: PCT/FR2019/052841
§ 371 (c)(1),
(2) Date: Jun. 10, 2021

(87) PCT Pub. No.: WO2020/120861
PCT Pub. Date: Jun. 18, 2020

(65) Prior Publication Data
US 2022/0038227 A1 Feb. 3, 2022

(30) Foreign Application Priority Data

Dec. 11, 2018 (FR) ...................................... 1872687

(51) Int. Cl.
*H04L 5/00* (2006.01)
*H04L 27/26* (2006.01)
*H04W 72/21* (2023.01)

(52) U.S. Cl.
CPC .......... *H04L 5/0035* (2013.01); *H04L 5/0048* (2013.01); *H04L 27/2646* (2013.01); *H04W 72/21* (2023.01)

(58) Field of Classification Search
CPC . H04L 5/0035; H04L 5/0048; H04L 27/2646; H04W 72/21
See application file for complete search history.

(56) References Cited

U.S. PATENT DOCUMENTS

| | | | |
|---|---|---|---|
| 11,764,938 B2* | 9/2023 | Fehrenbach | ...... H04W 56/0045 370/329 |
| 2016/0081049 A1* | 3/2016 | Suzuki | ..................... H04B 7/08 370/328 |

(Continued)

FOREIGN PATENT DOCUMENTS

| WO | WO 2015/012655 A1 | 1/2015 |
|---|---|---|
| WO | WO 2016/202401 A1 | 12/2016 |
| WO | WO 2017/194121 A1 | 11/2017 |

OTHER PUBLICATIONS

International Search Report and Written Opinion dated Apr. 2, 2020 for Application No. PCT/FR2019/052841.

(Continued)

*Primary Examiner* — Abdullahi Ahmed
(74) *Attorney, Agent, or Firm* — Knobbe, Martens, Olson & Bear, LLP

(57) ABSTRACT

A method for managing a transmission of sequences of symbols of predetermined duration by means of a terminal having dual connectivity with a first device for accessing a network and with a second device for accessing a network is described, the terminal being configured to transmit, when dual-connected, sequences of symbols over a first uplink to the first access device and over a second uplink to the second access device during disjoint time intervals. The method includes obtaining an estimate of a difference between delays in propagation between the terminal and the first and second access devices, and configuring the terminal to introduce at least one guard interval in each transmission of at least one sequence of symbols over the first uplink, during (Continued)

which no data symbol is transmitted by the terminal over the first uplink, the at least one guard interval being introduced by the terminal at the start of a first sequence of symbols and/or at the end of a last sequence of symbols transmitted in the transmission over the first uplink, and occupying a number of symbols determined according to the estimate of the difference between the propagation delays.

23 Claims, 4 Drawing Sheets

(56) References Cited

U.S. PATENT DOCUMENTS

| | | | | |
|---|---|---|---|---|
| 2019/0021063 | A1* | 1/2019 | Kawasaki | H04W 56/003 |
| 2019/0141590 | A1* | 5/2019 | Li | H04W 52/245 |
| 2020/0236693 | A1* | 7/2020 | Xing | H04W 72/1263 |
| 2021/0092697 | A1* | 3/2021 | Harada | H04W 56/001 |
| 2022/0272648 | A1* | 8/2022 | Korhonen | H04W 56/0025 |
| 2023/0283361 | A1* | 9/2023 | Fan | H04B 7/18519 455/427 |

OTHER PUBLICATIONS

Mueck Markus Dominik et al. "Global standards enabling a 5th Generation Communications system architecture vision" 2014 IEEE Globecom Workshops (GC Wkshps), IEEE, Dec. 8, 2014 (Dec. 8, 2014). pp. 571-576 DOI: 10.I 109/GLOCOMW.2014.7063493 XP032747830 p. 573-p. 576.

* cited by examiner

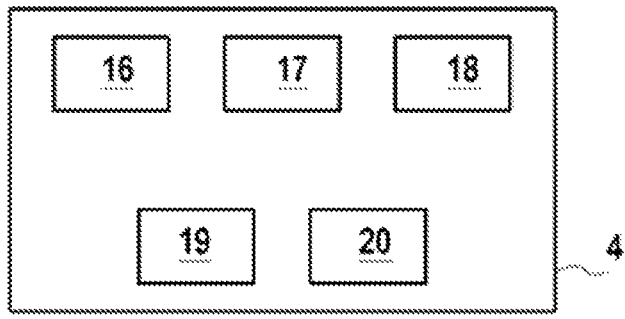
Fig. 5
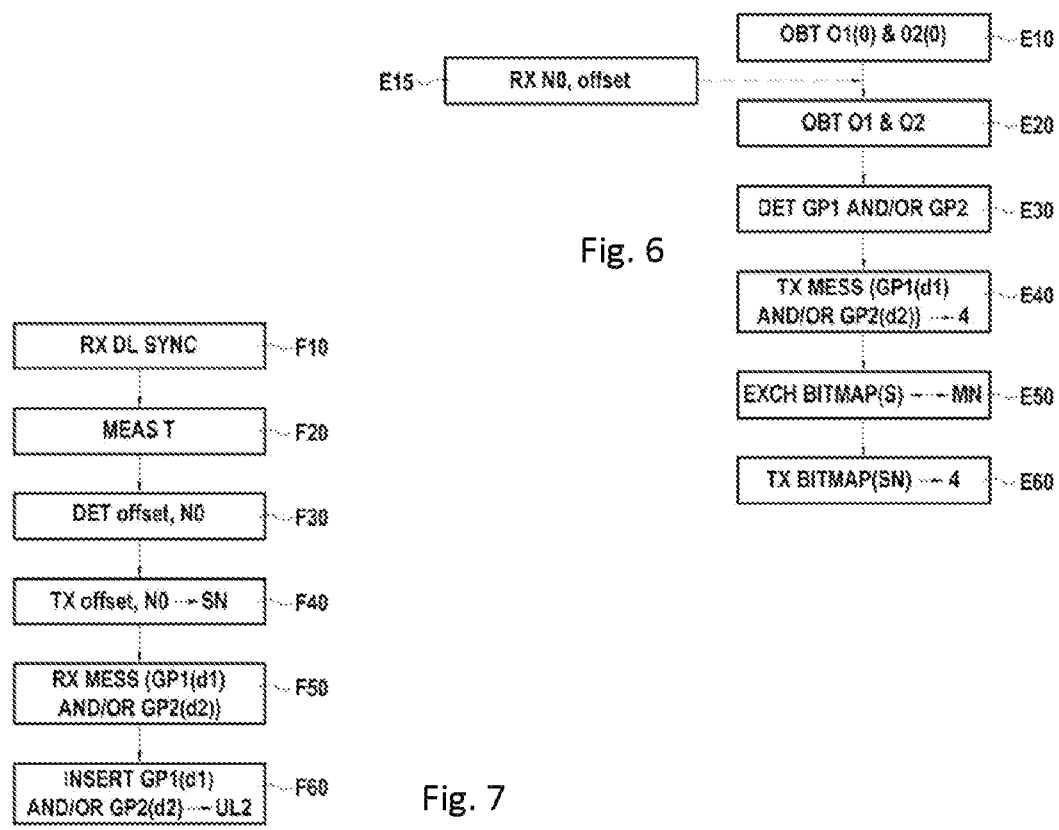
Fig. 6
Fig. 7

Fig. 8A
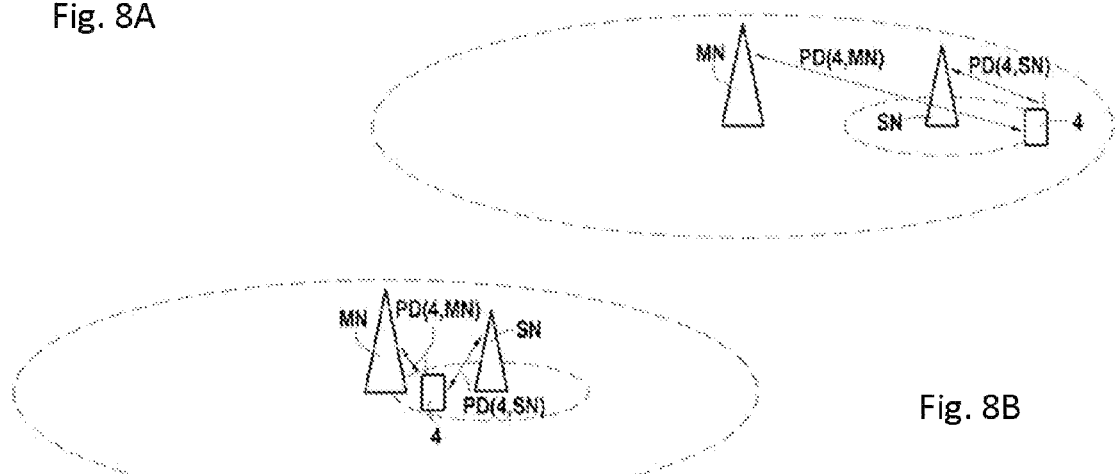
Fig. 8B
Fig. 9
Fig. 10
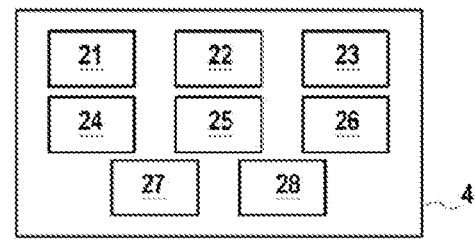

METHOD FOR MANAGING A TRANSMISSION OF SEQUENCES OF DATA SYMBOLS

RELATED APPLICATIONS

This application is the U.S. National Phase of Application No. PCT/FR2019/052841 entitled "METHOD FOR MANAGING A TRANSMISSION OF SEQUENCES OF DATA SYMBOLS" and filed Nov. 29, 2019, which claims the benefit of French Patent Application No. 1872687, filed Dec. 11, 2018, each of which is incorporated by reference in its entirety.

PRIOR ART

The invention relates to the general field of telecommunications.

It relates more particularly to a method for optimizing the uplink data transmission from a terminal benefiting from a Dual Connectivity at the radio level with a first access device for accessing a first telecommunications network and with a second access device for accessing a second telecommunications network (the first and second telecommunications networks may be identical or distinct), in a context where the terminal is authorized to transmit data at a given instant towards only one of the two access devices. This mode of operation is also known as "Single Uplink Operation" (SUO mode).

Such a scenario is currently envisaged by the 3GPP (Third Generation Partnership Program) standard in the context of $5^{th}$ Generation (5G) NR (New Radio) networks, where a terminal has the possibility of being simultaneously connected to a node called Master Node and to a node called Secondary Node, the master node and the secondary node not being co-located and being able to operate in distinct frequency bands. In the scenarios considered by the 3GPP EN-DC (E-UTRA NR Dual Connectivity) standard and NR NR DC (NR NR Dual Connectivity) standard, the master node is sometimes an access device for accessing a $4^{th}$ generation (4G) LTE (Long Term Evolution) network or eNodeB, sometimes an access device for accessing a 5G NR network or gNB, and the secondary node is a gNB access device for accessing a 5G NR network.

The dual connectivity is a mechanism which advantageously allows aggregating the radio resources (and in particular the rates) offered by the master and secondary nodes. In order to limit the interferences that may result from the simultaneous transmissions towards the two nodes and to optimize the coverage of each of the uplink nodes, the version ("release") 15 of the 3GPP standard specifies that the terminal is authorized at a given instant to transmit data towards only one of the two nodes: the terminal is therefore forced, in accordance with the 3GPP standard, to operate in SUO mode when it benefits from a dual connectivity. The exchanges between the master and secondary nodes to allow this dual connectivity in SUO mode have been standardized for EN-DC and NR NR DC and take place via the X2 and XN interfaces respectively.

Each of the master and secondary nodes manages the traffic which passes therethrough autonomously at the level of its MAC layer (Medium Access Layer) and its physical layer, and no information is exchanged between the MAC schedulers of the two nodes during this dual connectivity. It is therefore not possible to rely on any coordination between the MAC schedulers of the two nodes to implement the SUO mode.

The mechanism adopted by the 3GPP standard consists of a coordination between the master node and the secondary node based on the exchange of a two-dimensional map (a frequency dimension and a time dimension), more commonly referred to as "bitmap", indicating for each of the nodes, the physical resource blocks or PRB (Physical Resource Block) and the subframes (corresponding to a granularity of 1 ms) it occupies. A PRB corresponds to the smallest unit of frequency resource that can be allocated to a terminal: it occupies a bandwidth of 180 kHz, and a duration of 1 ms corresponding to a subframe. Each subframe comprises one or several slot(s) according to the numerology considered by the telecommunications network (for example, 1 slot for a spacing between the sub-carriers of 15 kHz, which corresponds in the LTE standard to the smallest transmission interval or TTI for Time Transmission Interval envisaged for the data channels), each slot comprising 14 data symbols. Each subframe belongs to a frame of a duration of 10 ms, numbered by an SFN number (System Frame Number) comprised between 0 and 1,023; each frame comprises 10 subframes numbered from 0 to 9.

The bitmap exchanges are carried out at the level of the PDCP (Packet Data Convergence Protocol) layer and are therefore slow and semi-static by nature. They allow the two nodes to agree on a Time Division Multiplexing (TDM) pattern to allow an operation in SUO mode: this pattern provides a semi-static configuration (per cell or per terminal) shared in one particular mode with the terminal defining which subframes emitted by the terminal are dedicated to the uplink towards the master node and which subframes are dedicated to the uplink towards the secondary node.

Given this mode of operation, the aspects of synchronization between the master and secondary nodes are important. The transmissions of the different subframes and frames sent on the uplinks towards the master and secondary nodes may indeed not be aligned due to asynchronism between the networks of the master and secondary nodes or to different timing advance values (intended to compensate for the propagation times between the master and secondary nodes and the terminal). This may have a direct impact on the time division multiplexing pattern to be exchanged between the master and secondary nodes to ensure that the terminal does not simultaneously transmit data towards both nodes. However, no information element is currently defined in the 3GPP standard to manage these aspects: the EN-DC scenario assumes that the networks of the master and secondary nodes are synchronized (see document R1-1711878 entitled "LS on Single UL transmission", June 2017), while an agreement during a meeting of the Working Group 1 (on the lower layers of the OSI model) briefly mentions the possibility of discussing the aspects of synchronization between the LTE and NR networks without however providing further details (cf. document R1-1711710 entitled "WF on NR-LTE coexistence", June 2017). This agreement was not followed up and does not seem to have had any impact on the exchanges between the two nodes forming the EN-DC scenario at the level of the X2 interface specified in the 3GPP TS 36.423 V15.2.0 (2018-06) standard, Section 9.2.116 and 9.2.117. As a result, the dual connectivity solutions implementing a mode of operation SUO in an asynchronous deployment context when the master and secondary nodes are not co-located, are today proprietary.

A solution that can be envisaged is illustrated in FIG. 1, in a context where a terminal UE has dual connectivity with a first node NODE1 and with a second node NODE2 via two uplinks UL1 and UL2 established respectively with these two nodes.

In FIG. 1, the first line referenced by "NODE1-UL1" represents the time boundaries of the numbered subframes Y, Y+1, Y+2, . . . (with Y=0, . . . , 9 modulo 10 in accordance with the 3GPP standard) emitted on the uplink UL1 by the terminal and received by the first node NODE1. The second line referenced by "NODE2-UL2" represents the time boundaries of the numbered subframes X, X+1, X+2, . . . (with X=0, . . . , 9 modulo 10 in accordance with the 3GPP standard) emitted on the uplink UL2 by the terminal and received by the second node NODE2. In accordance with the 3GPP standard, each subframe belongs to a numbered frame. The time boundaries of the subframes emitted on the uplinks UL1 and UL2 have in this example, a relative deviation referenced by "OFFSET", related to the absence of synchronization between the two nodes NODE1 and NODE2.

In a known manner, during the transmission of the subframes on the uplinks UL1 and UL2, the terminal UE must apply timing advance values TA1 and TA2 provided respectively by the nodes NODE1 and NODE2, and which allow taking into account the propagation time PD1 and PD2 between the terminal and the nodes NODE1 and NODE2 respectively (TA1=2.PD1 and TA2=2PD2). This allows guaranteeing that the subframes emitted by the terminal UE on the uplink channel UL1, respectively on the uplink channel UL2, are aligned with the time boundaries represented on the line NODE1-UL1, respectively on the line NODE2-UL2. If the relative deviation OFFSET mentioned above is taken into account, this means, for example by taking the node NODE2 as a reference, that the terminal UE must apply a timing advance of PD1+OFFSET on the uplink UL1 and a timing advance PD2 on the uplink UL2.

To comply with these different constraints in SUO mode, a solution may consist, as illustrated in FIG. 1, in defining and exchanging between the two nodes NODE1 and NODE2, for example on the X2 interface, a time division multiplexing pattern consisting, in the bitmap sent by the node NODE2 to the node NODE1, in reserving the subframes X+1 and X+2 for the uplink UL1 and, in the bitmap sent by the node NODE1 to the node NODE2, in reserving the subframes Y+3 and Y+4 for the uplink UL2. In other words, during the time interval corresponding to the subframes X+1 and X+2, the terminal UE does not transmit on the uplink UL2 (represented by hatching in FIG. 1) but transmits the subframe Y+2 on the uplink UL1; then during the time interval corresponding to the subframes Y+3 and Y+4, the terminal UE does not transmit on the uplink UL1 (represented by hatching in FIG. 1) but transmits the subframe X+3 on the uplink UL2; then during the time interval corresponding to the subframes X+4 and X+5, the terminal UE does not transmit on the uplink UL2 but transmits the subframe Y+5 on the uplink UL1; etc. This time division multiplexing pattern therefore results in a loss of spectral efficiency corresponding to the equivalent of a complete subframe (no transmission possible of the subframe X+4 or Y+4).

DISCLOSURE OF THE INVENTION

The invention allows reducing this loss of spectral efficiency by proposing a method for managing a transmission of sequences of data symbols of a determined duration by a terminal having a dual connectivity established with a first access device for accessing a telecommunications network and with a second access device for accessing a telecommunications network, said terminal being configured to transmit, during said dual connectivity, sequences of data symbols on a first uplink channel towards said first access device and on a second uplink channel towards said second access device during disjoint time intervals, said method comprising:

a step of obtaining an estimate of a deviation between propagation delays between the terminal and the first access device and between the terminal and the second access device;

a step of configuring the terminal so that it introduces at least one guard interval during each transmission of at least one sequence of data symbols on said first uplink channel towards the first access device, during which no data symbol is transmitted by said terminal on said first uplink channel, said at least one guard interval being introduced by the terminal at the start of a first sequence of data symbols and/or at the end of a last sequence of data symbols transmitted during said transmission on said first uplink channel, and occupying a number of symbols determined based on the estimate of said deviation between said propagation delays.

The first and second access devices may or may not belong to the same telecommunications network. Furthermore, no limitation is attached to the telecommunications networks of the access devices. However, the invention has a preferred application when one at least of the networks is a 4G LTE network or a 5G NR network (and when one at least of the access devices is an eNodeB device or a gNB device).

The invention thus proposes to introduce a guard interval at the start and/or at the end of each transmission of sequence(s) of data symbols that are contiguous and intended for one of the two access devices chosen as a reference (first access device within the meaning of the invention). It is noted that no limitation is attached to the duration or to the dimension of the considered sequences of data symbols, this being able to depend on the granularity envisaged on the network to transmit the data. Thus, a sequence of data symbols within the meaning of the invention may correspond to a subframe or to a slot for example.

The guard interval(s) considered in the invention is/are advantageously inserted in the first and/or in the last sequence of symbols (i.e. as a replacement for the data symbols) and correspond(s) to one (or several) time interval(s) during which the terminal does not transmit any data on the uplink with the reference access device. It is/they are dimensioned to take into account the aforementioned synchronization aspects between the two access devices, and in particular the propagation delays between the terminal and the two access devices.

In one asynchronous embodiment (i.e. in which the two access devices are not synchronized), the guard interval(s) is/are dimensioned furthermore based on a parameter estimated by the terminal representative of a synchronization deviation between the first and second access devices. In other words, the number of symbols of said at least one guard interval is in this embodiment determined based on the estimate of the deviation of the propagation times and on a synchronization deviation estimated by the terminal. This synchronization deviation can be estimated by the terminal from the synchronization signals emitted by the two access devices on the downlink channels and received by the terminal.

In this way, it is ensured that the transmissions on the two uplink channels are well disjoint while resulting in a loss of spectral efficiency less than one subframe; indeed, the loss of spectral efficiency resulting from the implementation of the invention corresponds to the dimension in number of data symbols of the introduced guard interval(s). This dimension depends on the numerology adopted on the link of the first access device taken as a reference but is, in any case, smaller than one subframe. The invention therefore proposes a simple and efficient solution for optimizing the dual connectivity in SUO mode.

Different variants can be envisaged to determine the dimension of the guard interval(s) to be applied by the terminal.

In a first variant, the obtaining step comprises obtaining:

a first value maximizing, for positions of the terminal comprised in a geographical area simultaneously covered by the first and second access devices and such that the propagation delay between the terminal and the second access device is greater than the propagation delay between the terminal and the first access device, a difference between the propagation delay between the terminal and the second access device and the propagation delay between the terminal and the first access device; and a second value maximizing, for positions of the terminal comprised in a geographical area simultaneously covered by the first and second access devices and such that the propagation delay between the terminal and the first access device is greater than the propagation delay between the terminal and the second access device, a difference between the propagation delay between the terminal and the first access device and the propagation delay between the terminal and the second access device.

In this first variant, during the terminal configuration step, the terminal is configured to introduce a first guard interval at the end of the last sequence of data symbols occupying a number of symbols determined based on the first value, and/or a second guard interval at the start of the first sequence of data symbols occupying a number of symbols determined based on the second value.

The first value and the second value can be determined by test and/or by simulation for example using coverage tools known per se, or by making field measurements. The advantage of this first variant is that it does not need to know the position of the terminal and, where applicable, its mobility: the dimensioning of the guard intervals is performed from values that are calculated to take into account the highest propagation delays likely to exist between the terminal and the first and second access devices given the configuration of the area covered by the two access devices.

Thus, the first value obtained relates to the case where the terminal is in a coverage area common to the two access devices but is closer to the first access device; the second value obtained on the contrary relates to the case where the terminal is in a coverage area common to the two access devices but is closer to the second access device. Depending on the configuration of the cells covered by the two access devices and the common coverage area resulting therefrom, either of these two values may be zero (for example when, due to the envisaged configuration, the terminal is caused to be in a common coverage area very remote from one of the access devices). In this case, this is equivalent to applying only one guard interval, either at the start or at the end of each transmission on the first uplink, based on the value which is not zero.

It should be noted that this "worst case" dimensioning envisaged in the first variant leads to dimensions of guard interval(s) which are caused to change little over time and which therefore do not require frequent updating.

According to a second variant, the terminal is configured to introduce a single guard interval at the start of the first sequence or at the end of the last sequence and the management method according to the invention comprises:

a step of estimating said deviation by the terminal from timing advance values associated with the first access device and with the second access device and provided to the terminal by the first access device and by the second access device respectively, said unique number of symbols and the introduction of the guard interval at the start of the first sequence or at the end of the last sequence being determined by the terminal based on said estimated deviation and on a geographical position of the terminal relative to the first and second access devices; and a step of providing the first access device by the terminal with said number of symbols.

This second variant consists of the introduction of a single guard interval whose position and dimensioning are optimized relative to the actual location of the terminal. This second variant allows further reducing the loss of spectral efficiency.

To this end, it is the terminal itself that determines the number of symbols over which the guard interval must extend, from the timing advance values it has received from the first and second access device and that reflect, as mentioned previously, the propagation times between the terminal and the first and second access devices. Such timing advance values are conventionally shared over the networks by the access devices with the terminals attached thereto in order to be applied in the uplink.

In addition, in this second variant, the terminal reports directly towards the first access device the number of symbols occupied by the guard interval to be applied: this number of symbols being already quantified, this allows limiting the signaling exchanged between the terminal and the first access device. Reporting, by the terminal, the number of symbols in the guard interval towards the first access device allows the latter to ensure the orchestration of the data transmissions on the network, in accordance with the mode of operation of the current networks (i.e. it is the network that organizes the data transmissions).

In one particular embodiment, the management method further comprises:

a step of receiving by the first access device, from the terminal, a number N0 representing an offset between the numbers of sequences of data symbols emitted on the first uplink channel and on the second uplink channel, said number N0 having been determined by the terminal from synchronization signals received from the first and second access devices; and a step of using by the first access device said offset during an exchange of bitmaps with the second access device intended to organize the transmission of the sequences of data symbols by the terminal on the first and second uplink channels during said dual connectivity.

This embodiment has a particular advantage in an asynchronous context in which the access devices belong to distinct telecommunications networks which are not synchronized with each other. In such a context, not only there can be an offset between the time boundaries of the data sequences received at the access devices, but also between the numbers of the data sequences received by each of the devices. By using for illustration the notations of FIG. 1 mentioned previously, this amounts to determining the value of the integer N0 such that $Y=X+N0$ or $X=Y+N0$ according to the access device taken as a reference. The terminal, thanks to the synchronization signals it receives from the first and second devices, is able to estimate the asynchronism between the two access devices between the numbers of received sequences represented by the integer N0.

This number is communicated to the first access device so that it can take it into account during the exchange of bitmaps with the second access device. It should be noted that this number does not need to be communicated by the first access device to the second access device: it is sufficient that only the first access device takes it into account during the exchange of the bitmaps to decide which sequences of data symbols are transmitted on the first uplink channel and which sequences of data symbols are transmitted on the second uplink channel. The second access device continues for its part to consider that the first access device is synchronous therewith, in other words the asynchronism present between the two access devices remains transparent for the second access device. Thus, by way of illustration, in the example considered above, if the first access device corresponds to the uplink channel UL2 and to the sequences of data symbols or subframes X, X+1, . . . , and if it is assumed that Y=X+N0 with N0=2, the first access device will be able to indicate in its bitmaps that it occupies for example the subframe X+2 while it occupies in reality the subframe X+4.

As mentioned previously, the invention proposes the introduction of one or several guard interval(s) in the sequences of data symbols transmitted on the uplink channel established during the dual connectivity with one of the access devices chosen as a reference node (first access device within the meaning of the invention). This introduction is transparent to the other access device. The implementation of the invention is therefore based more particularly on two entities, namely on the terminal and on the first access device, and also concerns the methods implemented by these entities to support the invention.

Thus, the invention also relates to a method for transmitting sequences of data symbols by a terminal having a dual connectivity established with a first access device for accessing a telecommunications network and with a second access device for accessing a telecommunications network, said terminal being configured to transmit, via said dual connectivity, sequences of data symbols to said first access device on a first uplink channel and to said second access device on a second uplink channel during disjoint time intervals, this method being intended to be implemented by the terminal and comprising:

a step of receiving from the first access device a message comprising at least a number of symbols of at least one guard interval to be introduced during each transmission of sequences of data symbols by the terminal on the first uplink channel towards the first access device, said at least one number of symbols having been determined based on an estimate of a deviation between propagation delays between the terminal and the first access device and between the terminal and the second access device;

during each transmission of sequences of data symbols by the terminal on the first uplink channel, a step of introducing said at least one guard interval at the start of a first sequence of data symbols and/or at the end of a last sequence of data symbols transmitted during said transmission on the first uplink channel based on a setpoint comprised in the message.

Correlatively, the invention also relates to a terminal having a dual connectivity established with a first access device for accessing a telecommunications network and with a access second device for accessing a telecommunications network, said terminal comprising a transmission module configured to transmit, via said dual connectivity, sequences of data symbols on a first uplink channel towards said first access device and on a second uplink channel towards said second access device during disjoint time intervals, said terminal further comprising:

a receiving module, able to receive from the first access device a message comprising at least one number of symbols of at least one guard interval to be introduced during each transmission of sequences of data symbols by the terminal on said first uplink channel towards the first access device, said at least one number of symbols having been determined based on an estimate of a deviation between propagation delays between the terminal and the first access device and between the terminal and the second access device; and an insertion module, activated during each transmission of sequences of data symbols by the terminal on said first uplink channel, and configured to introduce said at least one guard interval at the start of a first sequence of data symbols and/or at the end of a last sequence of data symbols transmitted during said transmission on said first uplink channel based on a setpoint comprised in the message.

The instruction comprised in the message can take different forms. It can in particular, in the example of a single guard interval, take the form of a bit having the value 0 if the guard interval must be introduced at the start of the first sequence or the value 1 if the guard interval must be introduced at the end of the last sequence. According to another variant, the number(s) of symbols comprised in the message can be signed, and have for example a positive value for a number of symbols corresponding to a guard interval inserted at the start of the first sequence and a negative value for a number of symbols corresponding to a guard interval inserted at the end of the last sequence. Of course, these examples are only given by way of illustration and other variants can be envisaged.

The transmission method and the terminal benefit from the same advantages described above as the management method.

In one particular embodiment, the message comprises a unique number of symbols, and said transmission method further comprising:

a step of estimating said deviation by the terminal from timing advance values associated with the first access device and with the second access device and provided to the terminal by the first access device and by the second access device access respectively, said unique number of symbols and the introduction of the guard interval at the start of the first sequence or at the end of the last sequence being determined by the terminal based on said estimated deviation and on a geographical position of the terminal relative to the first and second access devices; and a step of providing the first access device with said number of symbols.

Correlatively, in this embodiment, the terminal further comprising:

a first estimation module, configured to estimate said deviation from timing advance values associated with the first access device and with the second access device and provided to the terminal by the first access device and by the second device access respectively;

a determination module, configured to determine said unique number of symbols and whether the guard interval must be introduced at the start of the first sequence or at the end of the last sequence based on said estimated deviation and on a geographical position of the terminal relative to the first access device and to the second access device; and a first providing module, configured to provide the first access device with said number of symbols.

This embodiment allows, as mentioned previously, taking into account the actual position of the terminal in the area covered by the two access devices in order to dimension the guard interval to be applied and to decide whether it should be applied at the start or at the end of the transmission on the first uplink channel.

More particularly, in this embodiment, during the introduction step, the terminal introduces the guard interval:

at the start of the first sequence of data symbols if the propagation time between the terminal and the first access device is greater than the propagation time between the terminal and the second access device; and at the end of the last sequence of data symbols if the propagation time between the terminal and the second access device is greater than the propagation time between the terminal and the first access device.

The indication according to which the guard interval must be introduced at the start of the first sequence or at the end of the last sequence can be in particular provided by the terminal to the first access device (it can in particular take a form similar to the setpoint introduced in the message transmitted to the terminal).

In a particular embodiment, the sequences of data symbols emitted by the terminal on the first and second uplink channels are numbered and comprised in numbered frames, said transmission method further comprising a step of estimating a deviation of synchronization between the first and second access devices from synchronization signals received from the first and second access devices, this estimation step comprising:

a step of measuring, from the received synchronization signals, a time deviation T between time boundaries of frames bearing the same number, received from the terminal by the first and second access devices;

a step of determining, from the measured time deviation, a number N0 and an offset parameter such that:

$$T = N0 \cdot T0 + \text{offset}$$

where T0 denotes said determined duration of the sequences of data symbols, the number N0 and the offset parameter being representative of said synchronization deviation between the first and second access devices; and said at least one number of symbols being determined furthermore based on said offset parameter determined by the terminal.

Correlatively, in this embodiment, the terminal further comprises a second module for estimating a synchronization deviation between the first and second access devices, said second estimation module being configured to:

measure, from synchronization signals received from the first and second access devices, a time deviation T between time boundaries of frames bearing the same number, received from the terminal by the first and second access devices;

determine, from the measured time deviation T, a number N0 and an offset parameter such as:

$$T = N0 \cdot T0 + \text{offset}$$

where T0 denotes said determined duration of the sequences of data symbols, the number N0 and the offset parameter being representative of said synchronization deviation between the first and second access devices; and said at least one number of symbols being determined furthermore based on said offset parameter determined by the terminal.

This embodiment allows taking into account, in addition to the propagation delays for dimensioning the guard interval(s), the asynchronism that may exist between the access devices, this asynchronism being represented by the number N0 and by the offset parameter.

It is noted that in a particular embodiment in which said at least one number of symbols is determined by the first access device, the transmission method further comprises a step of providing said offset parameter by the terminal to the first access device.

In a particular embodiment, the transmission method further comprises a step of providing the number N0 to the first access device for use during an exchange of bitmaps with the second access device intended to organize the transmission of the sequences of data symbols by the terminal on the first and second uplink channels during said dual connectivity.

Correlatively, the terminal comprises in this embodiment a second providing module configured to provide the number N0 to the first access device for use during an exchange of bitmaps with the second access device intended to organize the transmission of the sequences of data symbols by the terminal on the first and second uplink channels during said dual connectivity.

As mentioned previously, the number of symbols of the guard interval(s) can be determined by the terminal or by the first access device. Thus, the invention also relates to an access device for accessing a telecommunications network, called first access device, able to manage a transmission of sequences of data symbols of predetermined duration by a terminal having a dual connectivity established with said first device for accessing a telecommunications network and with a second device for accessing a telecommunications network, said terminal being configured to transmit, during said dual connectivity, sequences of data symbols on a first uplink channel towards said first access device and on a second uplink channel towards said second access device during disjoint time intervals, said first access device comprising:

an obtaining module, able to obtain an estimate of a deviation between propagation delays between the terminal and the first access device and between the terminal and the second access device; and a configuration module, parameterized to configure the terminal so that it introduces at least one guard interval during each transmission of at least one sequence of data symbols on said first uplink channel towards the first access device, during which no data symbol is transmitted by said terminal on said first uplink channel, said at least one guard interval being introduced by the terminal at the start of a first sequence of data symbols and/or at the end of a last sequence of data symbols transmitted during said transmission on said first uplink channel, and occupying a number of symbols determined based on the estimate of said deviation between said propagation delays.

In one particular embodiment, the configuration module is configured to send to the terminal a message comprising the number of symbols occupied by each guard interval and a setpoint indicating whether said at least one guard interval must be introduced at the start of the first sequence of data symbols and/or at the end of the last sequence.

The first access device according to the invention benefits from the same advantages described above as the management method.

In one particular embodiment, the different steps of the management method and/or the different steps of the transmission method are determined by computer program instructions.

Consequently, the invention also relates to a computer program on an information medium, this program being likely to be implemented in an access device for accessing a telecommunications network, respectively in a terminal, or more generally in a computer, this program including instructions adapted to the implementation of the steps of a management method, respectively of a transmission method as described above.

This program can use any programming language and be in the form of source code, object code or intermediate code between source code and object code, such as in a partially compiled form, or in any other desirable form.

The invention also relates to an information or recording medium readable by a computer, and including instructions of a computer program as mentioned above.

The information or recording medium can be any entity or device capable of storing the program. For example, the medium may include a storage means, such as a ROM, for example a CD ROM or a microelectronic circuit ROM or a magnetic recording means, for example a floppy disk or a hard disk.

On the other hand, the information or recording medium can be a transmissible medium such as an electrical or optical signal, which can be routed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

The invention also relates to a communication system comprising:
a first device for accessing a telecommunications network;
a second device for accessing a telecommunications network; and
a terminal according to the invention, having a dual connectivity established with the first and the second access devices.

In one particular embodiment, the first access device conforms to the invention.

The communication system according to the invention benefits from the same advantages described above as the management method.

In one particular embodiment, the first access device and the second access device are devices for accessing the same telecommunications network.

In this embodiment, the first and second devices are advantageously synchronized, which simplifies the implementation of the invention.

As previously mentioned, no limitation is attached to the nature of the telecommunications networks of the first and second access devices. However, the invention has a preferred application when these networks are 4G LTE and/or 5G NR networks.

When one at least of the access devices is an access device for accessing a 5G NR network, this access device is preferably chosen as the first access device within the meaning of the invention. This allows benefiting from the largest time flexibility offered by 5G networks.

In one particular embodiment, the first access device uses a higher numerology than the second access device.

As known, in 4G and 5G networks, the numerology refers to the spacing between the subcarriers of the waveform used to transmit data symbols on the network. The spacing between the subcarriers is inversely proportional to the symbol time so that the higher the numerology, the smaller the symbol time. Taking the access device with the highest numerology and introducing the guard interval(s) recommended by the invention on the uplink channel established with this access device allows having better granularity in terms of duration of the guard interval(s) and thus further optimizing the loss in spectral efficiency resulting from these guard intervals.

In addition, in this embodiment, the first and second access devices can then be configured to exchange together bitmaps corresponding to the lowest numerology intended to organize the transmission of the sequences of data symbols by the terminal on the first and second uplink channels during said dual connectivity.

This provides better time granularity for the transmission of data symbols on the first and second uplink channels.

It can also be envisaged in other embodiments that the management method, the transmission method, the terminal, the first access device and the communication system according to the invention have in combination all or part of the aforementioned characteristics.

BRIEF DESCRIPTION OF THE DRAWINGS

Other characteristics and advantages of the present invention will emerge from the description given below, with reference to the appended drawings which illustrate an exemplary embodiment thereof without any limitation. In the figures:

FIG. 5 represents the main functional modules of a terminal according to the invention, in the first embodiment;

FIG. 6 represents, in flowchart form, the main steps of the management method according to the invention implemented by the access device of FIG. 4 in the first embodiment;

FIG. 7 represents, in flowchart form, the main steps of the transmission method according to the invention implemented by the terminal of FIG. 5 in the first embodiment;

FIG. 8A represents a case envisaged in the first embodiment to estimate the deviation between the propagation delays used to dimension the guard intervals in the first embodiment;

FIG. 8B represents a second case envisaged in the first embodiment to estimate the deviation between the propagation delays used to dimension the guard intervals in the first embodiment;

FIG. 9 illustrates the consequences of the introduction of one or two guard intervals in the first embodiment on the transmissions operated on the two uplink channels maintained by the terminal of FIG. 5;

FIG. 10 represents the main functional modules of a terminal according to the invention, in a second embodiment;

DESCRIPTION OF THE EMBODIMENTS

Figure 2:
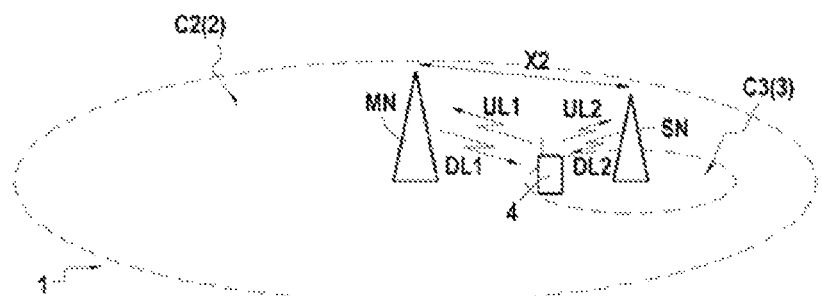
FIG. 2 represents a communication system in accordance with the invention.

FIG. 2 represents, in its environment, a communication system 1 in accordance with the invention, in one particular embodiment. The communication system 1 advantageously offers the possibility for a terminal to benefit from a dual connectivity with two devices for accessing telecommunications networks in Single Uplink Operation or SUO mode.

The communication system 1 comprises for this purpose:

an access device MN for accessing a telecommunications network 2, associated with a cell C2 of a telecommunications network 2;

an access device SN for accessing a telecommunications network 3, associated with a cell C3 of a telecommunications network 3; and a terminal 4, in accordance with the invention, benefiting from a dual connectivity established with the access device N1 and with the access device N2. The terminal 4 is for example a mobile terminal such as a smart phone or a digital tablet or a laptop, etc. it is noted that no limitation is attached to the nature of this terminal.

In the example envisaged in FIG. 2, the telecommunications network 2 is a 4G LTE network and the telecommunications network 3 is a 5G NR network: in other words, the access device MN is an eNodeB-type node and the access device SN is a gNB-type node. It is assumed here that the access devices MN and SN are not co-located and that the networks 2 and 3 are not synchronized. In this configuration, it is considered that for the implementation of the dual connectivity, the access device MN is the master node while the access device SN is the secondary node. This allows relying on the LTE core network of the access device MN during the dual connectivity.

However, these assumptions are not limiting per se, and the invention applies in other network configurations. In particular, the telecommunications networks 2 and 3 can be one and the same network, or be both 5G networks, the master node can be the access device for accessing the 5G network and the secondary node the access device for accessing the 4G network, the networks 2 and 3 can be synchronized, etc.

In a known manner, the dual connectivity results in the establishment by the terminal 4 of two radio media, that is to say two uplink channels UL1 and UL2, with respectively the access device MN and with the access device SN (and correspondingly by the establishment of two downlink channels DL1 and DL2 with the access devices MN and SN respectively). It is assumed here that the two access devices MN and SN have an X2 interface as defined in the 3GPP standard and described in particular in document 3GPP TS 36.423 V15.2.0 (2018-06), this interface allowing them to exchange various information during the dual connectivity, and in particular the bitmaps applied by the terminal 4 on the uplink channels UL1 and UL2. As mentioned earlier, these bitmaps define a two-dimensional map indicating which subframes and which physical resource blocks (or PRB) are dedicated to the uplink channel UL1 and which subframes and which physical resource blocks (or PRB) are dedicated to the uplink channel UL2. The format of the information contained in the bitmaps is described in document 3GPP TS 36.423 v15.2.0 Release 15, June 2018, in sections 9.2.116 and 9.2.117.

In accordance with the invention, the communication system 1 provides improved management of the uplink transmissions of the terminal 4 when the latter benefits from a dual connectivity in SUO mode. This improved management is permitted, in accordance with the invention, by the introduction of judiciously dimensioned guard interval(s) in the transmissions performed on the uplink channel established with one of the two access devices which plays the role of reference node. For the sake of simplicity, the uplink channel associated with the reference node is also taken as the reference channel in the remainder of the description. By guard interval is meant here a time interval during which the terminal does not transmit any data on the reference uplink channel although the negotiation of the bitmaps between the two access devices has lead to assign this time interval to the reference access device.

In the example considered here, each uplink transmission consists in sending by the terminal 4 one or several numbered subframes of a determined duration of 1 ms each (each subframe bearing a number between 0 and 9), each subframe belonging to a numbered frame with a duration of 10 ms (each frame bearing a number or SFN comprised between 0 and 1,023). Each subframe conveys a plurality of symbols and constitutes a sequence of data symbols within the meaning of the invention.

In the example envisaged here, as a reference node, the access device NR is chosen, that is to say the access device for accessing the 5G network 2 which acts as a secondary node during the dual connectivity. This assumption is however not limiting, and the master access device MN can alternatively be chosen as a reference node. The reference uplink channel in the remainder of the description is therefore the channel UL2.

The dimensioning of the guard interval(s) is advantageously performed according to the invention based in particular on the propagation times existing between the terminal 4 and the access devices MN and SN. In the embodiments described here, it furthermore takes into account an asynchronism between the access devices MN and SN.

In the remainder of the description, two embodiments of the invention are envisaged:

in a first embodiment, represented in FIGS. 4 to 9, the dimensioning of the guard interval(s) is performed by the reference node, that is to say by the access device SN (first access device within the meaning of the invention). In this first embodiment, the secondary access device SN conforms to the invention;

in a second embodiment, represented in FIGS. 5 to 13, the dimensioning of the guard interval(s) is performed by the terminal 4.

Figure 3:
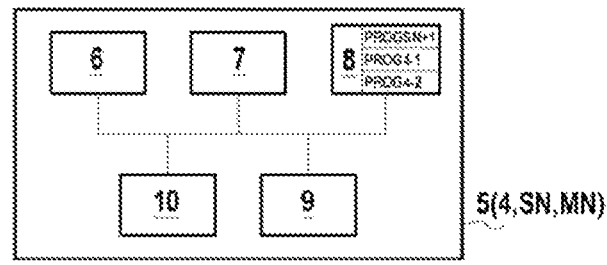
FIG. 3 represents the hardware architecture of a computer on which the entities of the communication system of FIG. 2 are based.

In these two embodiments, the access device MN, the access device SN and the terminal 4 have the hardware architecture of a computer 5, as schematically represented in FIG. 3.

They comprise in particular a processor 6, a random access memory 7, a read only memory 8, a non-volatile flash memory 9, as well as communication means 10 comprising one or several communication interface(s).

The communication means 10 of the terminal 4 and of the access device MN, respectively of the access device SN, allow them to communicate with each other via the telecommunications network 2 and in particular via the uplink UL1 and downlink DL1 channels, respectively via the telecommunications network 3 and in particular via the uplink UL2 and downlink DL2 channels (see FIG. 2).

The communication means 10 of the access devices MN and SN also allow them to communicate and to exchange information together and for this purpose implement the X2 interface mentioned above.

The two embodiments envisaged here will now be described in more detail.

First embodiment

In the first embodiment as mentioned above, the access device SN is an access device in accordance with the invention, able to implement the steps of the management method according to the invention.

Figure 4:
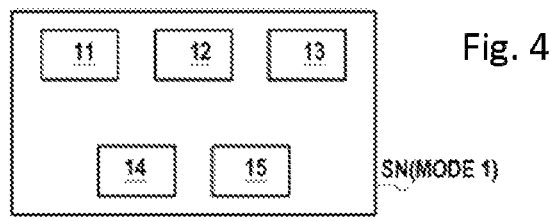
FIG. 4 represents the main functional modules of an access device according to the invention, in a first embodiment.

More specifically, the read only memory 8 of the access device SN constitutes a recording medium in accordance with the invention, readable by the processor 6 and on which a computer program PROGSN-1 in accordance with the invention is recorded, including instructions for executing the steps of the management method according to the invention corresponding to the first embodiment. This computer program PROGSN-1 defines, as illustrated in FIG. 4, functional modules (and software here) of the access device SN, which are configured to implement the steps of the management method according to the invention and which are based on and/or control the hardware elements 6-10 of the computer 5 mentioned above. These modules comprise here:

an obtaining module 11, able to obtain an estimate of a deviation between the propagation delays between the terminal 4 and the access device MN and between the terminal 4 and the access device SN;

a determination module 12, configured to determine a number of symbols occupied by one or several guard interval(s) intended to be applied by the terminal 4 during its transmissions on the reference uplink channel UL2 (first uplink channel within the meaning of invention), based on the estimate of the deviation between the propagation delays, and here, on the asynchronism between the access devices MN and SN; and a configuration module 13, parameterized to configure the terminal 4 so that it introduces such guard interval(s) occupying the number(s) of symbols determined by the determination module 12, during each transmission of at least one subframe of data symbols on the reference uplink channel UL2, at the start of the first subframe and/or at the end of the last subframe transmitted during this transmission on the uplink channel UL2.

Figure 1:
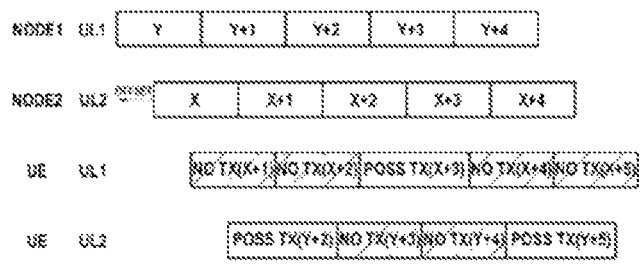
FIG. 1, already described, represents the state of the art.

In the example envisaged here where the access devices MN and SN are not synchronized, the asynchronism between the two access devices MN and SN can be expressed in various ways, namely:

by an offset, characterized by an integer N0, between the numbers of subframes and emitted respectively on the uplink channels UL1 and UL2; and by a time offset, referred in the remainder of the description to as "offset", between the time boundaries of the subframes emitted respectively on the uplink channels UL1 and UL2 (corresponding typically in the example illustrated in FIG. 1 to the parameter OFFSET).

In the first embodiment described here, it is the terminal 4 that determines these offsets (when they exist) representative of the asynchronism of the access devices MN and SN and provides them to the access device SN.

To take into account this asynchronism, the computer program PROGSN-1 stored in the read-only memory 8 of the access device SN also defines two other functional modules, namely a receiving module 14, able to receive from the terminal 4 an estimate of the number N0, and a use module 15 configured to use this number N0 during the exchange of the bitmaps with the access device MN as described in more detail later.

As mentioned above, the terminal 4 conforms to the invention and is able to implement the steps of the transmission method according to the invention. More specifically, the read only memory 8 of the terminal 4 constitutes a recording medium in accordance with the invention, readable by the processor 6 and on which a computer program PROG4-1 in accordance with the invention is recorded, including instructions for executing steps of the transmission method according to the invention in the first embodiment.

The computer program PROG4-1 defines, as illustrated in FIG. 5, functional modules (and software here) of the terminal 4, which are configured to implement the steps of the transmission method according to the invention and which are based on and/or control the hardware elements 6-10 of the computer 5 mentioned above. These modules comprise in particular:

a transmission module 16, based on the communication means 10 of the terminal 4 and configured to transmit, via said dual connectivity established with the two access devices MN and SN, subframes bearing a plurality of data symbols on the uplink channel UL1 towards the access device MN and on the uplink channel UL2 towards the access device SN during disjoint time intervals (in accordance with the SUO mode);

a receiving module 17, able to receive from the access device SN a message noted MESS comprising the number of symbols of the guard interval(s) to be introduced during each transmission of subframes on the reference uplink channel UL2, and a setpoint indicating where to introduce this/these guard interval(s) during each transmission on the uplink channel UL2; and an insertion module 18, activated during each transmission of subframes on the reference uplink channel UL2, and configured to introduce the guard interval(s) at the start of the first subframe and/or at the end of the last subframe transmitted during this transmission based on the setpoint comprised in the message MESS received from the access device SN.

In the first embodiment described here, the terminal 4 also has a module 19 for estimating a synchronization deviation between the access devices MN and SN. This estimation module 19 is configured to:

measure, from synchronization signals received on the downlink channels DL1 and DL2 of the access devices MN and SN, a time deviation T between the time boundaries of the frames bearing the same number and received from the terminal 4 by the access devices MN and SN; and determine, from the measured time deviation T, the number N0 and the offset parameter, as described in more detail later.

The terminal 4 also comprises a module 20 for providing the number N0 and the offset parameter representative of the synchronization deviation between the two access devices MN and SN to the access device SN.

FIGS. 6 and 7 will now be described, the different steps of the management and transmission methods as implemented by the communication system 1 in the first embodiment. More particularly, FIG. 6 represents the different steps of the management method as implemented by the reference access device SN in the first embodiment, and FIG. 7 represents the different steps of the transmission method as implemented by the terminal 4.

It is therefore assumed here that the terminal 4 has a dual connectivity established with the access devices MN and SN via the channels UL1/DL1 and UL2/DL2.

As mentioned previously, in the first embodiment of the invention, it is the access device SN that determines the position of the guard interval(s) as well as their dimensions. To this end, with reference to FIG. 6, the access device SN obtains, by means of its obtaining module 11, an estimate of the deviation between the propagation delays between the terminal 4 and the access device SN and between the terminal 4 and the access device MN (step E10).

In the first embodiment described here, this estimate comprises two values noted respectively O1(0) and O2(0), defined as follows:

the value O1(0) maximizes, for positions of the terminal 4 comprised in a geographical area covered simultaneously by the access devices MN and SN (in the example illustrated in FIG. 2, this joint coverage area coincides with the coverage area of the access device SN) and such that the propagation delay between the terminal 4 and the access device MN is greater than the propagation delay between the terminal 4 and the access device SN, a difference between the propagation delay noted PD(4,MN) between the terminal 4 and the access device MN and the propagation delay noted PD(4,SN) between the terminal 4 and the access device SN, namely:

$$O1(0)=\max(PD(4,MN)-PD(4,SN)) \text{ with } PD(4,MN)>PD(4,SN)$$

FIG. 8A represents, by way of illustration, a situation in which PD(4,MN)>PD(4,SN);

the value O2(0) maximizes, for positions of the terminal 4 comprised in a geographical area covered simultaneously by the access devices MN and SN and such that the propagation delay between the terminal 4 and the access device SN is greater than the propagation delay between the terminal 4 and the access device MN, a difference between the propagation delay PD(4,N) between the terminal 4 and the access device SN and the propagation delay PD(4,MN) between the terminal 4 and the access delay MN, namely:

$$O2(0)=\max(PD(4,SN)-PD(4,MN)) \text{ with } PD(4,SN)>PD(4,MN)$$

FIG. 8B represents, by way of illustration, a situation in which PD(4,SN)>PD(4,MN).

The values O1(0) and O2(0) can be obtained in different ways by the obtaining module 11 of the access device SN. They reflect the overlap that may exist between the time boundaries of the subframes sent respectively on the uplink channels UL1 and UL2 when the access devices MN and SN are synchronized. This overlap then results only from the difference between the timing advance values applied by the terminal 4 to transmit data symbols to the access devices MN and SN.

It should be noted that the telecommunications network 3 knows during the dual connectivity of the terminal 4 with the access devices MN and SN, the geographical positions of the access devices MN and SN, as well as their respective coverages. From this information, the values O1(0) and O2(0) can be determined by simulation, for example with coverage tools known per se and not described here, or via field measurements, by considering several possible positions for the terminal 4 in order to be able to determine the maximum values of the deviations of the propagation times defining the values O1(0) and O2(0).

The values O1(0) and O2(0) can be determined in this way either directly by the obtaining module 11 of the access device SN, or by another entity of the telecommunications network 3 and be provided by this entity to the obtaining module 11 of the first access device SN.

It should be noted that depending on the relative position of the access devices SN and MN and their respective coverage areas, one of the two values O1(0) and O2(0) may be zero.

In the first embodiment described here, to take in account the asynchronism between the two access devices MN and SN, the obtaining module 11 of the access device SN evaluates from the values O1(0) and O2(0) two new positive values noted O1 and O2 taking into account the offset between the time boundaries of the subframes emitted respectively on the uplink channels UL1 and UL2 (step E20).

In the first embodiment described here, the offset is determined by the terminal 4 from synchronization signals sent by the access devices MN and SN to the terminal 4 on the downlink channels DL1 and DL2 respectively. Such signals are conventionally sent over a telecommunications network by the access devices to the terminals so that the latter can synchronize with the access devices. They are therefore known per se and are not further described here.

More particularly, with reference to FIG. 7, following the receipt of the synchronization signals from the access devices MN and SN (step F10), the terminal 4, by means of its estimation module 19, measures from synchronization signals the time deviation noted T between the time boundaries of the frames transmitted on the two downlink channels DL1 and DL2 and bearing the same number SFN (step F20).

Then, the estimation module 19 of the terminal 4 determines, from the thus measured time deviation T, the offset parameter as well as the integer N0 (step F30). More specifically, the time deviation T is defined as follows:

$$T=N0 \cdot T0+\text{offset}$$

where T0 denotes the duration of the subframes (1 ms in the example envisaged here) transmitted on the uplink channels UL1 and UL2. N0 denotes, as mentioned previously, an integer greater than or equal to 0 representing the offset between the numbers of subframes and emitted respectively on the uplink channels UL1 and UL2.

In the first embodiment described here, the offset parameter is a relative number. Its sign is determined relative to the reference uplink channel, namely UL2 in the envisaged example: thus, the offset parameter is chosen positive if the time boundary of the subframes of the reference channel UL2 is found after the time boundary of the subframes emitted on the other channel (UL1 here) (cf. situation illustrated in FIG. 1), and is chosen negative otherwise.

Thus, from the duration T0, the estimation module 19 is able to determine the number N0 and the offset parameter; these two elements are representative of the synchronization deviation between the access devices MN and SN.

The providing module 20 of the terminal 4 provides the number N0 and the thus determined offset parameter to the access device SN (step F40).

Referring to FIG. 6, following the receipt of the offset parameter and of the number N0 by its receiving module 14 (step E15), the access device SN calculates the values O1 and O2 as follows:

$$O1=\max(0,O1(0)+\text{offset})$$

$$O2=\max(0,O2(0)-\text{offset})$$

Then, from the values O1 and O2, the access device SN, via its determination module 12, determines how many (one or two) guard interval(s) must be inserted by the terminal 4 during its transmissions on the reference uplink channel UL2, as well as the dimension and the positioning of this/these interval(s) during each transmission (step E30).

It is noted that if one of the two values O1 or O2 is zero, only one guard interval is inserted. Indeed:

a non-zero value O1 reflects the existence, in a worst case, of an overlap between the start of a transmission of subframe(s) on the uplink channel UL1 and the end of a transmission on the uplink channel UL2, given the propagation delays between the terminal 4 and the access devices MN and SN, and the asynchronism between the two access devices MN and SN. To avoid this overlap, the invention proposes to introduce a guard interval noted GP1 at the end of each transmission from the terminal 4 on the uplink channel UL2, in the last subframe of data symbols transmitted during this transmission. It is recalled that a transmission on the uplink channel UL2 can comprise one or several symbol subframes based on the bitmaps negotiated between the access devices MN and SN. The dimension of the guard interval GP1 is determined by the determination module 12 based on the value O1, in other words based on the value of O1(0) and on the offset parameter. It is noted that in the synchronous case, offset=0 and the dimension of the guard interval GP1 is determined from O1(0) directly;

similarly, a non-zero O2 value reflects the existence, in a worst case, of an overlap between the end of a transmission of subframe(s) on the uplink channel UL1 and the start of a transmission on the uplink channel UL2. In this case, the invention proposes to introduce a guard interval noted GP2 at the start of each transmission on the reference uplink channel UL2, in the first subframe of data symbols transmitted during this transmission. The dimension of the guard interval GP2 is determined by the determination module 12 based on the value O2, in other words based on the value of O2(0) and on the offset parameter. As for the guard interval GP1, in the synchronous case, offset=0 and the dimension of the guard interval GP2 is determined from O2(0) directly.

In this way, it is ensured that the guard interval(s) GP1 and/or GP2 are dimensioned in relation to the worst case that can be encountered in terms of offsets between the transmissions on the uplink channels UL1 and UL2: the introduction of these guard intervals GP1 and/or GP2 on the uplink channel UL2 therefore allows ensuring that no simultaneous transmission by the terminal 4 takes place on the uplink channels UL1 and UL2 and thus guaranteeing the proper operation of the SUO mode during the dual connectivity.

The dimensions d1 and d2 of the guard intervals GP1 and GP2 are determined by the determination module 12 of the access device SN in number of symbols (OFDM symbols in the case of a 4G or 5G network). This number of symbols depends on the numerology used on the reference uplink channel UL2. As examples, assuming that only the value O1 is non-zero and equal to $6.67.10^{-5}$. This result:

for a numerology defining a spacing between the subcarriers of 15 kHz, corresponding to a symbol time of $7.13.10^{-5}$, in the introduction of a guard interval GP1 occupying a data symbol (i.e. d1=1);

for a numerology defining a spacing between the subcarriers of 30 kHz, corresponding to a symbol time of $3.57.10^{-5}$, in the introduction of a guard interval GP1 occupying two data symbols (i.e. d1=2); and for a numerology defining a spacing between the subcarriers of 120 kHz, corresponding to a symbol time of $8.91.10^{-6}$, in the introduction of a guard interval GP1 occupying eight data symbols (i.e. d1=8).

Once the dimensions d1 and/or d2 have been determined (depending on whether a single guard interval GP1 or GP2 or two guard intervals GP1 and GP2 is/are considered), the access device SN configures the terminal 4 so that it introduces the guard interval(s) GP1 and/or GP2 in its transmissions on the reference uplink channel UL2 (step E40). In the first embodiment described here, this configuration is done by sending, by the configuration module 13 of the access device SN, a message MESS to the terminal 4 comprising the number(s) of symbols d1 and d2 of the guard interval(s) GP1 and/or GP2 to be introduced.

The message MESS sent to the terminal 4 further contains a setpoint indicating where the guard interval(s) must be introduced by the terminal 4, namely at the start of the first subframe transmitted on the uplink channel UL2 (for the guard interval GP2) or at the end of the last sequence transmitted on the uplink channel UL2 (for the guard interval GP1). This setpoint can take the form of a bit, if a single guard interval must be introduced by the terminal 4, taking for example the value 0 if the guard interval must be introduced at the start of the first subframe or the value 1 if the guard interval is to be introduced at the end of the last transmitted subframe.

Alternatively, relative (i.e. signed), that is to say positive or negative, values can be assigned to the dimensions d1 and d2, depending on whether they denote the number of symbols occupied by a guard interval to be introduced at the start of the first subframe or at the end of the last subframe.

Of course, these examples are given only by way of illustration, and other ways can be envisaged to inform the terminal 4 on the position of the guard interval(s) during the transmission on the uplink channel UL2.

Furthermore, the access device SN undertakes an exchange with the access device MN on the X2 interface in order to organize the transmission of the subframes of data symbol by the terminal 4 on the uplink channels UL1 and UL2 during the dual connectivity (step E50). This exchange consists of the exchange between the access devices MN and SN of one or several bitmap(s) (the exchange may be iterative) intended to define which subframes and which physical resource blocks are dedicated to the access device MN and to the second access device SN respectively on the uplink channels UL1 and UL2. It is implemented in the first embodiment described here, by relying on the information elements defined in document 3GPP TS 36.423 v15.2.0, June 2018 in paragraphs 9.2.116 and 9.2.117.

However, this exchange differs from what is defined in the 3GPP standard by the fact that the access device SN takes into account, when sending a bitmap towards the access device MN, the offset represented by the number NO estimated by the terminal 4. This is done transparently for the access device MN which continues to negotiate with the access device SN as if the two access devices were synchronized.

Thus, for example, if the time boundaries of the subframes transmitted on the uplink channel UL1 are before the time boundaries on the uplink channel UL2, this amounts for the access device SN to announcing in its bitmap that it will occupy a numbered subframe X while it will actually occupy the numbered subframe X+N0.

At the end of the negotiation of the bitmaps between the access devices MN and SN, the negotiated bitmaps are transmitted in a particular mode by each of the devices for accessing the terminal 4 to be applied to the uplink channels UL1 and UL2 (step E60). The terminal does not have to know the bitmap agreed by the two nodes. Indeed, it can simply obey the upward direction resource allocation control information dynamically sent by the two nodes ("UL grant") in the downward direction. The control information sent by each of the two nodes must comply with the bitmap exchanged by the nodes beforehand.

The terminal 4 then sends, via its transmission module 16 and its communication means 10, the subframes of data symbols intended for the access devices MN and SN. Furthermore, in accordance with the invention and with the configuration indicated in the message MESS received from the access device SN (step F50), the terminal 4, by means of its insertion module 18, introduces (inserts) into each transmission of one or several subframe(s) performed on the reference uplink channel UL2 towards the access device SN (step F60):

a guard interval GP1 occupying d1 data symbols at the end of the last subframe emitted during this transmission; and/or a guard interval GP2 occupying d2 data symbols at the start of the first subframe emitted during this transmission.

By "guard interval" it is meant that no data symbol is transmitted to the intended location of the guard interval in the last and/or in the first subframe, depending on the case, and over a period of time extending over the number of symbols determined for this guard interval.

The insertion of the guard intervals and its consequences on the transmissions on the uplink channels UL1 and UL2 are represented in FIG. 9 in one example given by way of illustration.

In this figure:
the line referenced by "UL1(MN) MAX POS≠" represents how the transmissions are organized in the example considered on the uplink channel UL1 associated with the access device MN, in the (worst) case where an offset O1 exists between the time boundaries of the subframes on the uplink channel UL1 and the time boundaries of the subframes on the reference uplink channel UL2 (represented on the line referenced by "UL2(SN)"), in a direction qualified as "positive" which corresponds to the case where the time boundaries of the subframes on the uplink channel UL1 are advanced relative to the time boundaries of the subframes on the reference uplink channel UL2. "NO TX(UL1)" means that no transmission is performed on the uplink channel UL1 while "TX(UL1)" means that subframes of data symbols are transmitted by the terminal 4 on the channel UL1;

the line referenced by "UL1(MN) ∀ POS≠" represents how the transmissions are organized in the example considered on the uplink channel UL1 associated with the access device MN, when any offset (but lower offset or worst case offset O1) exists between the time boundaries of the subframes on the uplink channel UL1 and the time boundaries of the subframes on the reference uplink channel UL2, in the positive qualified direction;

the line referenced by "UL1(MN) MAX NEG≠" represents how the transmissions are organized in the example considered on the uplink channel UL1 associated with the access device MN, in the (worst) case where an offset O2 exists between the time boundaries of the subframes on the uplink channel UL1 and the time boundaries of the subframes on the reference uplink channel UL2 in a direction qualified as "negative" which corresponds to the case where the time boundaries of the subframes on the uplink channel UL1 are received delayed with respect to the time boundaries of the subframes on the reference uplink channel UL2;

the line referenced by "UL1(MN) ∀ NEG≠" represents how the transmissions are organized in the example considered on the uplink channel UL1 associated with the access device MN, when any offset (but lower offset or worst case offset O2) exists between the time boundaries of the subframes on the uplink channel UL1 and the time boundaries of the subframes on the reference uplink channel UL2 in the negative direction; and the line referenced by "UL2(SN)" represents how the transmissions are organized in the example considered on the reference uplink channel UL2 associated with the access device SN, with the insertion in the illustrated example of guard intervals GP1 and GP2 (resulting in an equivalent way in a single guard interval GP of dimension d1+d2). "NO TX(UL2)" means that no transmission is performed on the uplink channel UL2 while "TX(UL2)" means that subframes of data symbols are transmitted by the terminal 4 on the channel UL2. The guard intervals are inserted in accordance with the invention in the part reserved for the transmissions on the uplink channel UL2.

Second Embodiment

In the second embodiment as mentioned above, the steps of the management method according to the invention are distributed over various entities of the communication system 1, namely by the terminal 4 and by the reference access device SN.

More specifically, in the second embodiment, it is the terminal 4 that obtains the deviation between the propagation delays and that determines, from this deviation, the number of symbols of the guard interval to be inserted in the uplink transmissions on the channel UL2.

To this end, the read only memory 8 of the terminal 4 constitutes a recording medium in accordance with the invention, readable by the processor 6 and on which a computer program PROG4-2 in accordance with the invention are recorded, including instructions for executing the steps of the transmission method according to the invention in the second embodiment.

The computer program PROG4-2 defines, as illustrated in FIG. 10, functional (and here software) modules of the terminal 4, which are configured to implement the steps of the transmission method according to the invention and which are based on and/or control the hardware elements 6-10 of the computer 5 mentioned above. These modules comprise in particular:

a transmission module 21, based on the communication means 10 of the terminal 4 and configured to transmit, via said dual connectivity established with the two access devices MN and SN, subframes bearing a plurality of data symbols on the uplink channel UL1 towards the access device MN and on the uplink channel UL2 towards the access device SN during disjoint time intervals (in accordance with the SUO mode);

a receiving module 22, able to receive from the access device SN a message noted MESS comprising the number of symbols of a guard interval to be introduced during each transmission of subframes on the reference uplink channel UL2, and a setpoint indicating where to introduce this guard interval during each transmission on the uplink channel UL2;

an insertion module 23, activated during each transmission of subframes on the reference uplink channel UL2, and configured to introduce the guard interval at the start of the first subframe and/or at the end of the last subframe transmitted during this transmission based on the setpoint comprised in the message MESS received from the access device SN;

a module 24 for estimating a synchronization deviation between the access devices MN and SN, configured to:

measure, from synchronization signals received on the downlink channels DL1 and DL2 from the access devices MN and SN, the time deviation T between the time boundaries of the frames bearing the same number and received from the terminal 4 by the access devices MN and SN; and determine, from the measured time deviation T, the number NO and the offset parameter representative of the synchronization deviation between the access devices MN and SN; and a module 25 for providing the number NO to the access device SN.

The modules 21 to 24 are identical to the modules 16 to 19 previously described in the first embodiment.

In the second embodiment, the program PROG4-2 also defines three other functional modules of the terminal 4, namely:

an estimation module 26, configured to estimate the deviation between the propagation delays PD(4,SN) and PD(4,MN) from timing advance values associated with the access devices SN and MN and provided to the terminal 4 by the access devices SN and MN; and a determination module 27, configured to determine the number of symbols of the guard interval and whether the guard interval must be introduced at the start of the first sequence or at the end of the last sequence based on the deviation estimated by the estimation module 26 and on the geographical position of the terminal 4 relative to the access devices MN and SN; and a providing module 28 (which may be the same as the providing module 25), configured to provide the reference access device SN with the number of symbols determined by the determination module 27.

Figure 11:
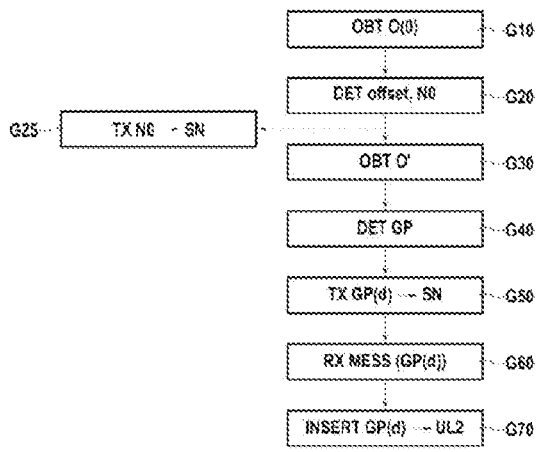
FIG. 11 represents, in flowchart form, the main steps of the transmission method according to the invention implemented by the terminal in the second embodiment.
Figure 12:
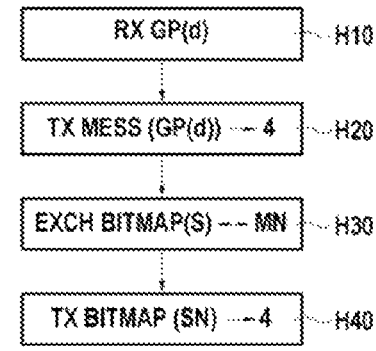
FIG. 12 represents, in flowchart form, the main steps of the management method implemented by the reference access device in the second embodiment.

FIGS. 11 and 12 will now describe the different steps of the management and transmission methods as implemented by the communication system 1 in the second embodiment. More particularly, FIG. 11 represents the different steps of the transmission method implemented by the terminal 4 and FIG. 12 represents the different steps of the management method implemented by the reference access device SN in the second embodiment.

It is assumed that the terminal 4 has a dual connectivity established with the access devices MN and SN through channels UL1/DL1 and UL2/DL2.

As mentioned previously, in the second embodiment of the invention, it is the terminal 4 that determines the position of the guard interval to be applied on the uplink channel UL2 with the access device SN as well as its dimension. During this determination, the terminal 4 can advantageously take into account its geographical position relative to the access devices SN and MN and therefore determine where the guard interval must be located (at the start or at the end of each transmission) to avoid the overlaps between the subframes sent on the uplink channels UL1 and UL2. Consequently, in the second embodiment, only one guard interval is provided and its positioning in the transmission on the uplink channel UL2 depends on the geographical position of the terminal 4 relative to the access devices SN and MN (i.e. according to whether it is closer to the access device SN, and than the propagation time PD(4,SN)<PD(4,MN), or to the access device MN and than the propagation time PD(4,MN) <PD(4,SN)).

More particularly, with reference to FIG. 11, the access device SN estimates, by means of its estimation module 26, an estimate of the deviation between the propagation delays PD(4,SN) and PD(4,MN) between the terminal 4 and the access device SN and between the terminal 4 and the access device MN respectively (step G10).

In the second embodiment described here, this estimate comprises, based on the geographical position of the terminal 4 relative to the access devices SN and MN, a value noted O'(0) which takes either of the values O1'(0) and O2'(0) defined by:

$$O1'(0)=PD(4,MN)-PD(4,SN) \text{ if } PD(4,MN)>PD(4,SN)$$

$$O2'(0)=PD(4,SN)-PD(4,MN) \text{ if } PD(4,SN)>PD(4,MN)$$

based on the relative position of the terminal 4 relative to the access devices MN and SN. It should be noted that by definition, only one of the two values O1'(0) and O2'(0) is non-zero.

The propagation times PD(4,MN) and PD(4,SN) used to estimate the value O' are determined by the estimation module 26 of the terminal 4 from the timing advance values at its disposal and which are provided to it respectively by the access devices MN and SN, in a manner known per se.

In the second embodiment described here, to take into account the asynchronism between the two access devices MN and SN, the estimation module 26 of the terminal 4 evaluates from the non-zero value O'(0), a new positive value noted O' taking into account the offset between the time boundaries of the subframes emitted respectively on the uplink channels UL1 and UL2 (step G30).

As in the first embodiment, the offset is determined by the terminal 4 via its estimation module 24 from synchronization signals sent by the access devices MN and SN to the terminal 4 on the downlink channels DL1 and DL2 respectively (step G20). Step G20 of determining the offset parameter by the estimation module 24 implements the same procedure as the steps F10 to F30 described above for the first embodiment.

During this step G20, the estimation module 24 of the terminal 4 also determines the number N0 it transmits to the reference access device SN (step G25).

The estimation module 26 of terminal 4 then calculates the value O' as follows:

$$O'=\max(O'1,O'2)$$

with $$O1'=\max(0,O1'(0)+\text{offset})$$

$$O2'=\max(0,O2'(0)-\text{offset})$$

It is noted that only one of the two values O1' or O2' is non-zero depending on the geographical position of the terminal 4, and that only this value is preferably calculated by the estimation module 26 of the terminal 4.

Then the terminal 4 determines where the guard interval GP must be inserted during its transmissions on the reference uplink channel UL2 as well as its dimension (step G40). More particularly:

if O'=O'1 (and O2'=0), the guard interval GP is introduced at the end of each transmission from the terminal 4 on the uplink channel UL2, in the last subframe of data symbols transmitted during this transmission; and if O'=O'2 (and O1'=0), the guard interval GP is introduced at the start of each transmission from the terminal 4 on the uplink channel UL2, in the first subframe of data symbols transmitted during this transmission.

The dimension d of the guard interval GP is determined by the determination module 27 of the terminal 4 in number of symbols (OFDM symbols in the case of a 4G or 5G network). This number of symbols depends on the numerology used on the reference uplink channel UL2, as mentioned previously for the first embodiment.

Once the dimension d and its position during the transmission of the data symbols on the channel UL2 are determined, the terminal 4 provides this information to the reference access device SN (step G50). It is noted that it can provide during the same step the number N0 estimated during step G20 (instead of doing it in a separate step as described here).

With reference to FIG. 12, upon receipt of this information (step H10), the reference access device SN configures the terminal 4 so that it introduces the guard interval GP in its transmissions on the reference uplink channel UL2 (step H20). As in the first embodiment, this configuration is made by sending, by the access device SN, a message MESS to the terminal 4 comprising the number of symbols d of the guard interval GP to be introduced.

The message MESS sent to the terminal 4 also contains a setpoint indicating where the guard interval must be introduced by the terminal 4, namely at the start of the first subframe transmitted on the uplink channel UL2 or at the end of the last sequence transmitted on the uplink channel UL2. This setpoint can take the form of a bit taking for example the value 0 if the guard interval must be introduced at the start of the first subframe or the value 1 if the guard interval must be introduced at the end of the last transmitted subframe; alternatively, the dimension d can take a signed, that is to say positive or negative, value depending on whether it designates the number of symbols occupied by a guard interval to be introduced at the start of the first subframe or at the end of the last subframe.

Furthermore, the access device SN undertakes an exchange with the access device MN on the X2 interface with a view to organizing the transmission of the subframes of data symbols by the terminal 4 on the uplink channels UL1 and UL2 during the dual connectivity (step H30). This exchange takes place identically to what has been described for the first embodiment for step E50.

At the end of the negotiation of the bitmaps between the access devices MN and SN, the negotiated bitmaps are transmitted in a particular mode by each of the access devices to the terminal 4 to be applied to the uplink channels UL1 and UL2 (step H40).

With reference to FIG. 12, as in the first embodiment, the terminal 4 then sends the subframes of data symbols intended for the access devices MN and SN by introducing (inserting) by means of its insertion module 23, in accordance with the invention and with the configuration indicated in the message MESS received from the access device SN (step G60), a guard interval GP in each transmission of one or several subframes performed on the reference uplink channel UL2 (step G70). The guard interval GP occupying d data symbols is inserted at the end of the last subframe emitted during the transmission if the terminal 4 is located closer to the access device SN and at the start of the first subframe emitted during this transmission otherwise.

Figure 13:
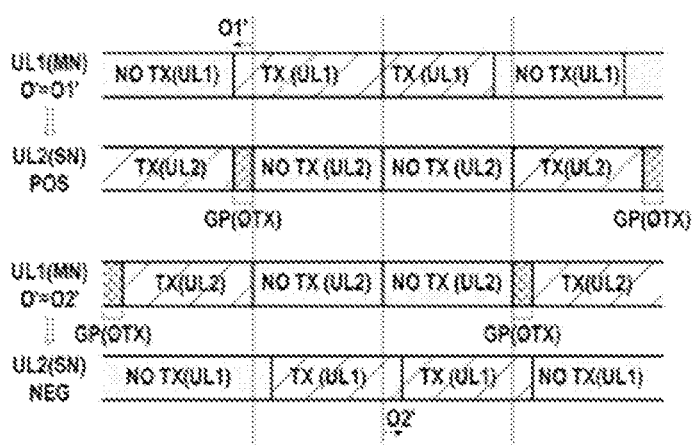
FIG. 13 illustrates the consequences of the introduction of a guard interval in the second embodiment on the transmissions operated on the two uplink channels maintained by the terminal of FIG. 10.

The insertion of the guard interval GP and its consequences on the transmissions on the uplink channels UL1 and UL2 are represented in FIG. 13 in an example given for illustrative purposes.

In this figure:

the line referenced by "UL1(MN) O'=O1'" represents how the transmissions are organized, in the considered example, on the uplink channel UL1 associated with the access device MN, when O'=O1' (offset between the time boundaries of the subframes on the uplink channel UL1 and the time boundaries of the subframes on the reference uplink channel UL2 in the positive direction, with the same conventions as in FIG. 9);

the line referenced by "UL2(SN) POS" represents how the transmissions are organized, in the considered example, on the reference uplink channel UL2 associated with the access device SN, with the insertion of the guard interval GP of dimension d at the end of each transmission on the uplink channel UL2 (to compensate for the offset O'=O'1);

the line referenced by "UL1(MN) O'=O'" represents how the transmissions are organized, in the considered example, on the uplink channel UL1 associated with the access device MN, when O'=O2' (offset between the time boundaries of the subframes on the uplink channel UL1 and the time boundaries of the subframes on the reference uplink channel UL2 in the negative direction; and the line referenced by "UL2(SN) NEG" represents how the transmissions are organized, in the considered example, on the reference uplink channel UL2 associated with the access device SN, with the insertion of the guard interval GP of dimension d at the start of each transmission on the uplink channel UL2 (to compensate for the offset O'=O'2).

In the two embodiments described here, the secondary access device SN participating in the dual connectivity was chosen as a reference access device. This assumption is not limiting per se, and alternatively other criteria can be applied to select the reference access device (first access device within the meaning of the invention). Thus, for example, the chosen reference access device may be the one that uses the highest numerology between the two access devices MN and SN.

Moreover, independently of the chosen reference access device, during steps E50 and H30 of exchanging bitmaps between the two access devices MN and SN, it can be assumed that these bitmaps are developed based on the lowest numerology used by the two access devices MN and SN, and/or that the number of symbols of the guard interval(s) to be inserted is determined based on this highest numerology. In this way, a better granularity and a loss of minimum spectral efficiency related to the introduction of the guard interval(s) are obtained.

The invention claimed is:

1. A method for managing a transmission of sequences of data symbols of determined duration by a terminal having a dual connectivity established with a first access device for accessing a telecommunications network and with a second access device for accessing a telecommunications network, the terminal configured to transmit, during the dual connectivity, sequences of data symbols on a first uplink channel towards the first access device and on a second uplink channel towards the second access device during disjoint time intervals, the method comprising:

obtaining an estimate of a deviation between propagation delays between the terminal and the first access device and between the terminal and the second access device; and configuring the terminal so that it introduces at least one guard interval during each transmission of at least one sequence of data symbols on the first uplink channel towards the first access device, during which no data symbol is transmitted by the terminal on the first uplink channel, the at least one guard interval being introduced by the terminal at the start of a first sequence of data symbols and/or at the end of a last sequence of data symbols transmitted during the transmission on the first uplink channel, and occupying a number of symbols determined based on the estimate of the deviation between the propagation delays.

2. The method of claim 1, wherein the number of symbols of the at least one guard interval is determined furthermore based on a parameter estimated by the terminal representative of a synchronization deviation between the first and second access devices.

3. The method of claim 1 wherein obtaining the estimate of the deviation comprises obtaining:
a first value maximizing, for positions of the terminal comprised in a geographical area simultaneously covered by the first and second access devices and such that the propagation delay between the terminal and the second access device is greater than the propagation delay between the terminal and the first access device, a difference between the propagation delay between the terminal and the second access device and the propagation delay between the terminal and the first access device; and
a second value maximizing, for positions of the terminal comprised in a geographical area simultaneously covered by the first and second access devices and such that the propagation delay between the terminal and the first access device is greater than the propagation delay between the terminal and the second access device, a difference between the propagation delay between the terminal and the first access device and the propagation delay between the terminal and the second access device; and
wherein during the configuration of the terminal, the terminal is configured to introduce a first guard interval at the end of the last sequence of data symbols occupying a number of symbols determined based on the first value, and/or a second guard interval at the start of the first sequence of data symbols occupying a number of symbols determined based on the second value.

4. The method of claim 1, wherein the sequences of data symbols emitted by the terminal on the first and second uplink channels are numbered and comprised in numbered frames, the management method further comprising:
receiving by the first access device, from the terminal, a number N0 representing an offset between numbers of sequences of data symbols emitted on the first uplink channel and on the second uplink channel, the number N0 having been determined by the terminal from synchronization signals received from the first and second access devices; and
using, by the first access device, the offset during an exchange of bitmaps with the second access device intended to organize the transmission of the sequences of data symbols by the terminal on the first and second uplink channels during the dual connectivity.

5. A method for transmitting sequences of data symbols by a terminal having a dual connectivity established with a first device for accessing a telecommunications network and with a second device for accessing a telecommunications network, the terminal being configured to transmit, via the dual connectivity, sequences of data symbols to the first access device on a first uplink channel and to the second access device on a second uplink channel during disjoint time intervals, the method implemented by the terminal and comprising:
receiving from the first access device a message comprising at least a number of symbols of at least one guard interval to be introduced during each transmission of sequences of data symbols by the terminal on the first uplink channel towards the first access device, the at least one number of symbols having been determined based on an estimate of a deviation between propagation delays between the terminal and the first access device and between the terminal and the second access device; and
during each transmission of sequences of data symbols by the terminal on the first uplink channel, introducing the at least one guard interval at the start of a first sequence of data symbols and/or at the end of a last sequence of data symbols transmitted during the transmission on the first uplink based on a setpoint comprised in the message.

6. The method of claim 5, wherein the message comprises a unique number of symbols, the transmission method further comprising:
estimating the deviation by the terminal from timing advance values associated with the first access device and with the second access device and provided to the terminal by the first access device and by the second access device respectively, the unique number of symbols and the introduction of the guard interval at the start of the first sequence or at the end of the last sequence being determined by the terminal based on the estimated deviation and on a geographical position of the terminal relative to the first and second access devices; and
providing the first access device with the number of symbols.

7. The method of claim 6, wherein during the introduction of the at least one guard interval, the terminal introduces the guard interval:
at the start of the first sequence of data symbols if the propagation time between the terminal and the first access device is greater than the propagation time between the terminal and the second access device; and
at the end of the last sequence of data symbols if the propagation time between the terminal and the second access device is greater than the propagation time between the terminal and the first access device.

8. The method of claim 5, wherein the sequences of data symbols emitted by the terminal on the first and second uplink channels are numbered and comprised in numbered frames, the transmission method further comprising estimating a deviation of synchronization between the first and second access devices from synchronization signals received from the first and second access devices, this estimation comprising:
measuring, from the received synchronization signals, a time deviation T between time boundaries of frames bearing the same number received from the terminal by the first and second access devices; and
determining, from the measured time deviation, a number N0 and an offset parameter such that:

$$T = N0 \cdot T0 + \text{offset}$$

where T0 denotes the determined duration of the sequences of data symbols, the number N0 and the offset parameter being representative of the synchronization deviation between the first and second access devices; and the at least one number of symbols being determined furthermore based on the offset parameter determined by the terminal.

9. The method of claim 8 further comprising a step of providing (G25) the number N0 to the first access device for use during an exchange of bitmaps with the second access device intended to organize the transmission of the sequences of data symbols by the terminal on the first and second uplink channels during the dual connectivity.

10. A non-transitory, computer readable storage medium having stored thereon instructions which, when executed by a processor, cause the processor to implement the method of claim 1.

11. A non-transitory, computer readable storage medium having stored thereon instructions which, when executed by a processor, cause the processor to implement the method of claim 5.

12. A first access device for accessing a telecommunications network, the first access device able to manage a transmission of sequences of data symbols of predetermined duration by a terminal having a dual connectivity established with the first device for accessing a telecommunications network and with a second access device for accessing a telecommunications network, the terminal being configured to transmit, during the dual connectivity, sequences of data symbols on a first uplink channel towards the first access device and on a second uplink channel towards the second access device during disjoint time intervals, the first access device comprising a processor, the first access device configured to:
    obtain an estimate of a deviation between propagation delays between the terminal and the first access device and between the terminal and the second access device; and
    configure the terminal so that it introduces at least one guard interval during each transmission of at least one sequence of data symbols on the first uplink channel towards the first access device, during which no data symbol is transmitted by the terminal on the first uplink channel, the at least one guard interval being introduced by the terminal at the start of a first sequence of data symbols and/or at the end a last sequence of data symbols transmitted during the transmission on the first uplink channel, and occupying a number of symbols determined based on the estimate of the deviation between the propagation delays.

13. The first access device of claim 12, wherein the first access device is configured to send to the terminal a message comprising the number of symbols occupied by each guard interval.

14. A terminal having a dual connectivity established with a first access device for accessing a telecommunications network and with a second access device for accessing a telecommunications network, the terminal comprising a processor, the terminal configured to:
    transmit, via the dual connectivity, sequences of data symbols on a first uplink channel towards the first access device and on a second uplink channel towards the second access device during disjoint time intervals, the terminal further comprising a processor, the terminal configured to:
    receive from the first access device a message comprising at least one number of symbols of at least one guard interval to be introduced during each transmission of sequences of data symbols by the terminal on the first uplink towards the first access device, the at least one number of symbols having been determined based on an estimate of a deviation between propagation delays between the terminal and the first access device and between the terminal and the second access device; and
    during each transmission of sequences of data symbols by the terminal on the first uplink channel, introduce the at least one guard interval at the start of a first sequence of data symbols and/or at the end of a last sequence of data symbols transmitted during the transmission on the first uplink channel based on a setpoint comprised in the message.

15. The terminal according to claim 14, wherein said at least one number of symbols comprises a unique number of symbols, said terminal further comprising configured to:
    estimate the deviation from timing advance values associated with the first access device and with the second access device and provided to the terminal by the first access device and by the second access device respectively;
    determine the unique number of symbols and whether the guard interval must be introduced at the start of the first sequence or at the end of the last sequence based on the estimated deviation and on a geographical position of the terminal relative to the first access device and to the second access device; and
    provide the first access device with the number of symbols.

16. The terminal of claim 14, wherein the sequences of data symbols emitted by the terminal on the first and second uplink channels are numbered and comprised in numbered frames, the terminal further configured to estimate a synchronization deviation between the first and second access devices, the estimation of the synchronization deviation comprising:
    measuring, from synchronization signals, received from the first and second access devices, a time deviation T between time boundaries of frames bearing the same number, received from the terminal by the first and second access devices; and
    determining, from the measured time deviation T, a number N0 and an offset parameter such that:

$$T = N0 \cdot T0 + \text{offset}$$

where T0 denotes the determined duration of the sequences of data symbols, the number N0 and the offset parameter being representative of the synchronization deviation between the first and second access devices, the at least one number of symbols being determined based on the offset parameter determined by the terminal.

17. The terminal of claim 16, wherein the terminal is further configured to provide the number N0 to the first access device for use during an exchange of bitmaps with the second access device intended to organize the transmission of the sequences of data symbols by the terminal on the first and second uplink channels during the dual connectivity.

18. A communication system comprising:
    a first access device for accessing a telecommunications network;
    a second access device for accessing a telecommunications network; and
    the terminal of claim 14 having a dual connectivity established with the first and the second access devices.

19. The communication system of claim 18, wherein the first access device is able to manage a transmission of sequences of data symbols of predetermined duration by the terminal having a dual connectivity established with the first device for accessing a telecommunications network and with a second access device for accessing a telecommunications network, the terminal being configured to transmit, during the dual connectivity, sequences of data symbols on a first uplink channel towards the first access device and on a second uplink channel towards the second access device during disjoint time intervals, the first access device comprising a processor, the first access device configured to:
- obtain the estimate of a deviation between propagation delays between the terminal and the first access device and between the terminal and the second access device; and
- configure the terminal so that it introduces the at least one guard interval during each transmission of at least one sequence of data symbols on the first uplink channel towards the first access device, during which no data symbol is transmitted by the terminal on the first uplink channel, the at least one guard interval being introduced by the terminal at the start of a first sequence of data symbols and/or at the end a last sequence of data symbols transmitted during the transmission on the first uplink channel, and occupying a number of symbols determined based on the estimate of the deviation between the propagation delays.

20. The communication system of claim 18, wherein the first access device and the second access device are devices for accessing the same telecommunications network.

21. The communication system of claim 18 wherein the first access device is a device for accessing a 5G telecommunications network.

22. The communication system of claim 18, wherein the first access device uses a higher numerology than the second access device.

23. The communication system of claim 22 wherein the first and second access devices are configured to exchange together bitmaps corresponding to the highest numerology intended to organize the transmission of the sequences of data symbols by the terminal on the first and second uplink channels during the dual connectivity.

* * * * *